A. JUST.
CLEANING AND DYEING MACHINE.
APPLICATION FILED FEB. 27, 1914.

1,125,691. Patented Jan. 19, 1915.
2 SHEETS—SHEET 1.

A. JUST.
CLEANING AND DYEING MACHINE.
APPLICATION FILED FEB. 27, 1914.
1,125,691.
Patented Jan. 19, 1915.
2 SHEETS—SHEET 2.
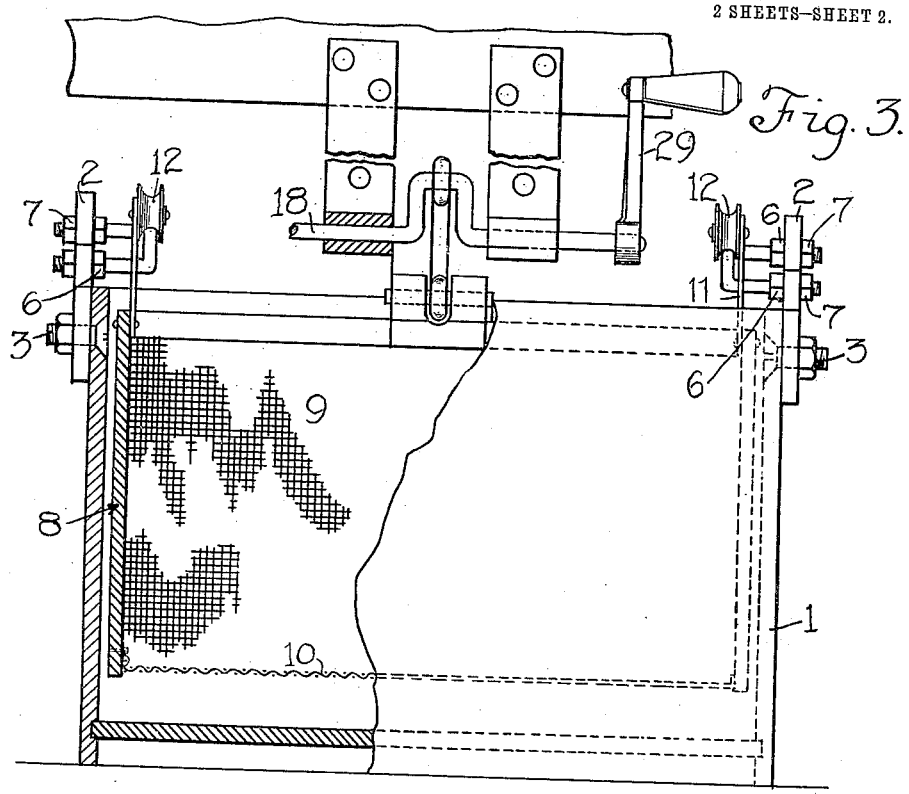
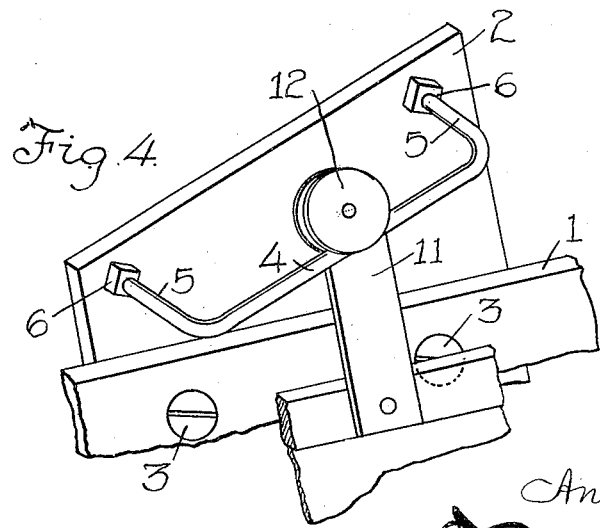

UNITED STATES PATENT OFFICE.

ANGELO JUST, OF WEST HOBOKEN, NEW JERSEY.

CLEANING AND DYEING MACHINE.

1,125,691.　　　　Specification of Letters Patent.　　Patented Jan. 19, 1915.

Application filed February 27, 1914. Serial No. 821,509.

*To all whom it may concern:*

Be it known that I, ANGELO JUST, a citizen of the United States, residing at West Hoboken, in the county of Hudson and State of New Jersey, have invented certain new and useful Improvements in Cleaning and Dyeing Machines; and I do hereby declare the following to be a full, clear, and exact description of the invention, such as will enable others skilled in the art to which it appertains to make and use the same.

This invention relates to cleaning and dyeing machines and one of the principal objects of the same is to provide an apparatus of simple construction for cleaning and dyeing fabrics, or garments, comprising a container for the liquid and a foraminous cage adapted to be moved or reciprocated in said liquid in various directions to submit the fabrics to the liquid under agitation.

Another object of the invention is to provide an apparatus comprising a tank, for receiving the liquid and a cage for containing the goods to be treated, said cage having means whereby it is moved longitudinally of the tank and vertically by means of inclined tracks and rollers on which the cage is supported, thus giving to the cage a constant movement in a back and forth and inclined up and down direction.

Figure 1:
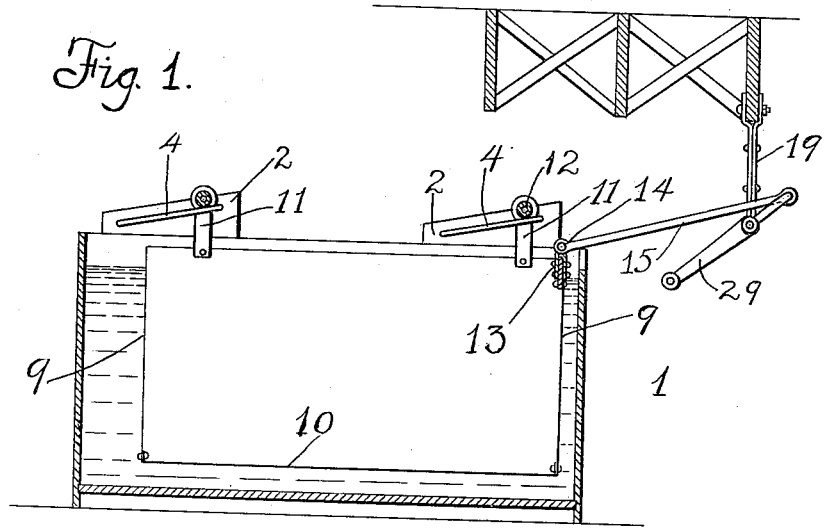
Figure 2:
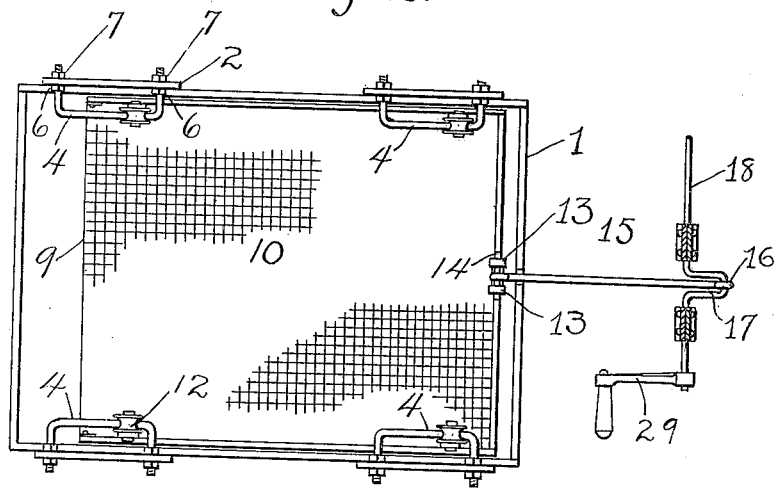

These and other objects may be attained by means of the construction illustrated in the accompanying drawings, in which, Figure 1 is a longitudinal sectional view through an apparatus made in accordance with this invention, Fig. 2 is a top plan view of the same, Fig. 3 is a transverse vertical sectional view of the same on a larger scale, part of the apparatus being shown in elevation, and Fig. 4 is a detail perspective view showing the manner of mounting the cage within the tank.

Referring to the drawings the numeral 1 designates a tank for containing the dyeing or cleansing liquid. The tank 1 is rectangular in form, and is provided at its opposite sides, near its ends, with brackets 2, said brackets being secured to the sides of the tank 1 by fastenings 3. The brackets 2 are provided with an inclined upper edge, and secured to each of the brackets in parallel relation to the upper edge thereof are inclined tracks or rails 4, said rails having their ends bent at right angles as at 5 and extending through the brackets 2, the ends of the members 5 being screw threaded to receive nuts 6 upon one side of the brackets 2 and lock nuts 7 upon the opposite side thereof.

The cage 8 has wire gauze or foraminous ends and bottom 9 and 10, while the sides may be of plain imperforate material. Secured to the upper edge of the spaced sides of the cage near each end thereof are brackets 11, and journaled to the upper ends of the brackets are grooved rollers 12. The rollers 12 journaled to the brackets 11 are mounted to rotate on the rails 4.

Connected to one end of the cage is a bracket 13 for supporting a short shaft 14, and connected to said shaft is a connecting rod 15, the opposite end of which is pivotally mounted at 16 upon a crank 17, formed upon a shaft 18 journaled in a suitable hanger 19. The shaft 18 is provided with a crank handle 29 by means of which the cage is reciprocated and moved in an inclined up and down direction as will be apparent from the positions of the rails 4 and the grooved rollers 12.

From the foregoing it will be obvious that if it is desired to use the apparatus for dyeing fabrics or garments they are placed within the cage and that the tank 1 is filled with the required dyeing liquid. The movement of the cage within the tank will submit all portions of the fabric to the action of the dyeing material owing to the movement of the cage. If the machine or apparatus is to be used as a cleansing or washing machine hot suds may be substituted for the dyeing liquid and the clothes are placed within the cage and the latter is moved back and forth and on the inclined tracks to submit the clothes to all the movement necessary to loosen the dirt and thoroughly cleanse the same.

The invention is simple in construction can be operated by unskilled persons, is not liable to get out of order and can be manufactured at low cost.

What is claimed is:—

1. A dyeing and cleaning apparatus comprising a tank, brackets connected to said tank at the opposite sides and near the ends thereof, rollers connected to said brackets and disposed in inclined positions, a cage having foraminous ends and bottom, brackets connected to said cage, grooved rollers mounted on said brackets, said rollers being adapted to run on the inclined rails, and means for moving said cage back and forth within the tank in an inclined direction.

2. A dyeing and cleaning apparatus comprising a tank for receiving the liquid, inclined tracks at the upper edges of the sides of said tank, a foraminous cage, brackets connected to said cage and provided with grooved rollers to run on said tracks, and means for moving the cage back and forth in an inclined direction in said tank.

3. In an apparatus for cleaning and dyeing the combination of a tank, or container, having brackets secured to the upper edges of the sides thereof, inclined rails connected to said brackets, a foraminous cage mounted in said tank, said cage being provided with grooved rollers mounted to run on said tracks and means for reciprocating said cage within said tank.

4. In a dyeing and cleaning apparatus the combination of a liquid containing tank, brackets on said tank, inclined rails on said brackets, a cage within said tank, brackets on said cage, grooved rollers journaled in said brackets to run on said rails, a crank shaft, a connecting rod attached at one end to said crank, and at the opposite end to said cage, and a crank handle on the end of said crank shaft.

5. In a dyeing and cleaning apparatus the combination of a liquid containing tank, a cage within said tank, said cage having a foraminous bottom and foraminous ends, and imperforate sides, and means whereby said cage may be moved endwise in an inclined direction.

In testimony whereof I affix my signature in presence of two witnesses.

ANGELO JUST.

Witnesses:
ANTONIO GULLACE,
DENIARIO GIUSEPPE.

Copies of this patent may be obtained for five cents each, by addressing the "Commissioner of Patents, Washington, D. C."